(12) United States Patent
Bhat et al.

(10) Patent No.: US 8,665,976 B2
(45) Date of Patent: Mar. 4, 2014

(54) BLIND SYMBOL SYNCHRONIZATION SCHEME FOR OFDM SYSTEM

(75) Inventors: Shrinivas Bhat, Bangalore (IN); Vishwakumara Kayargadde, Bangalore (IN); Parag Naik, Bangalore (IN)

(73) Assignee: Saankhya Labs Pvt. Ltd., Bangalore (IN)

( * ) Notice: Subject to any disclaimer, the term of this patent is extended or adjusted under 35 U.S.C. 154(b) by 0 days.

(21) Appl. No.: 13/436,022

(22) Filed: Mar. 30, 2012

(65) Prior Publication Data

US 2012/0250799 A1 Oct. 4, 2012

(30) Foreign Application Priority Data

Mar. 31, 2011 (IN) ............... 1087/CHE/2011

(51) Int. Cl.
*H04K 1/10* (2006.01)

(52) U.S. Cl.
USPC ............ 375/260; 341/180; 370/464; 375/355

(58) Field of Classification Search
None
See application file for complete search history.

(56) References Cited

U.S. PATENT DOCUMENTS

| | | | |
|---|---|---|---|
| 7,236,554 B2 | 6/2007 | Gupta | |
| 7,596,182 B1* | 9/2009 | Lee et al. | 375/262 |
| 2011/0280329 A1* | 11/2011 | Yonge et al. | 375/267 |
| 2012/0121003 A1* | 5/2012 | Kleider et al. | 375/229 |
| 2012/0134404 A1* | 5/2012 | Strait | 375/226 |

FOREIGN PATENT DOCUMENTS

| | | |
|---|---|---|
| WO | 2005074223 A1 | 8/2005 |
| WO | 2009059250 A2 | 5/2009 |

\* cited by examiner

*Primary Examiner* — Adolf Dsouza
(74) *Attorney, Agent, or Firm* — Rahman LLC

(57) ABSTRACT

An Orthogonal Frequency Division Multiplexing (OFDM) receiver system for improved pilotless detection of symbol boundary of a received OFDM symbols using M-ary Phase Shift Keying (M-PSK) modulated carriers as a cost function. The OFDM receiver includes a symbol boundary detection block that detects a symbol boundary of the received OFDM symbols. The symbol boundary detection block detects the symbol boundary by computing a cost function of a second order moment of the M-PSK modulated carriers. The receiver system detects the symbol boundary for unknown information on the received OFDM symbols.

14 Claims, 8 Drawing Sheets

BLIND SYMBOL SYNCHRONIZATION SCHEME FOR OFDM SYSTEM

CROSS-REFERENCE TO RELATED APPLICATIONS

This application claims priority to Indian patent application no. 1087/CHE/2011 filed on Mar. 31, 2011, the complete disclosure of which, in its entirety, is herein incorporated by reference.

BACKGROUND

1. Technical Field

The embodiments herein generally relate to Orthogonal Frequency Division Multiplexing (OFDM) receivers, and, more particularly to estimation of symbol boundaries using second order moment of the M-ary Phase Shift Keying (M-PSK) modulated pilots as the cost function in an OFDM receiver.

2. Description of the Related Art

In OFDM based systems the identification of a Fast Fourier Transform (FFT) boundary is a very important part of receiver symbol synchronization. Inaccurate or wrong detection of the FFT boundary may lead to phase errors in the payload carriers, which would lead to Bit Error Rate (BER) failures in the system, in the absence of suitable algorithms compensating for such phase errors. Typical OFDM system allocates some carriers to send known information for reducing the information carrying capacity of the system. These carriers are generally used for receiver synchronization and channel estimation.

One approach is using the Inverse Fast Fourier Transform (IFFT) of a channel estimate to get a symbol boundary for the system. This solution would require the pilot carriers to have the known information in turn reducing the payload of the system. Other approaches use the pilot phases for symbol synchronization which would only work when the symbol boundary is close to coarse symbol boundary. There are other schemes which use phase discontinuities on the pilots to determine the symbol boundaries.

FIG. 1 illustrates a block diagram depicting a portion of a typical OFDM receiver having a coarse symbol boundary detection block 102, a Fast Fourier Transformation (FET) window control block 104, a Fast Fourier Transformation (FFT) block 106, a carrier frequency (CF) and a sampling frequency (SF) offset estimation block 108, a channel estimation and correction block 110, a symbol boundary detection block 112, and a de-mapping and channel decoder block 112. Typically in OFDM receivers, symbol synchronization for OFDM system is done in two stages (i) Coarse Symbol Synchronization (CSS) and (ii) Fine Symbol Synchronization (FSS).

The coarse symbol synchronization uses the autocorrelation property of the OFDM symbol to determine the FFT window position which is controlled by the FFT window control block 104. With CSS (Coarse Symbol Synchronization), the FFT symbol boundary is within the guard interval of the OFDM symbol. Identification of the exact boundary of the FFT is an essential part of the OFDM systems because the OFDM signal is demodulated based on symbol structure whose arrival time is unknown. The wrong symbol synchronization would cause the Inter-Symbol Interference (ISI) resulting in an increase in Bit Error Rate (BER). Hence it is essential to achieve accurate and fast symbol synchronization for OFDM systems. All the above schemes require the information on the pilots to be known for determining the symbol boundary. Accordingly, there remains a need for receiver system and method for identifying the FFT boundary without the need for known information on the pilot carriers of the OFDM systems.

SUMMARY

In view of the foregoing, an embodiment herein provides an Orthogonal Frequency Division Multiplexing (OFDM) receiver system for pilotless detection of a symbol boundary for a received OFDM symbol using M-ary Phase Shift Keying (M-PSK) modulated carrier as a cost function. The OFDM receiver includes a symbol boundary detection block that detects the symbol boundary for the received OFDM symbol. The symbol boundary detection block detects the symbol boundary by computing a cost function of the second order moment of the M-PSK modulated carrier. The receiver system is capable of detecting the symbol boundary for unknown information (e.g. pilotless) on the M-PSK modulated carrier of the OFDM symbol and thus increases throughput per given transmission bandwidth of a modulation scheme.

In one aspect, an Orthogonal Frequency Division Multiplexing (OFDM) receiver for improved detection of a symbol boundary for received OFDM symbol using M-ary Phase Shift Keying (M-PSK) modulated pilot in the received OFDM symbol is provided. The system includes (i) a Fast Fourier Transformation (FFT) window block that positions a FFT window on the received OFDM symbol to a obtain frequency domain OFDM symbol and (ii) a symbol boundary detection block that detects a symbol boundary for the received OFDM symbol by recording a zero mean phase deviation for each of the FFT window. The pilot phase of the M-PSK modulated pilot is extracted from the frequency domain OFDM symbol and a second order moment of the M-PSK modulated pilot is used as a cost function for determining the symbol boundary. In one embodiment the M-PSK modulated pilot is a BPSK modulated signal or a QPSK modulated signal. The receiver system further includes (iii) a Fast Fourier Transformation (FFT) block which is connected to the FFT window control block and performs a FFT on the received OFDM symbol and (iv) a carrier frequency (CF) and a sampling frequency (SF) block that receives the received OFDM symbol for CF and SF synchronization.

In another aspect, a method for detection of a symbol boundary for a received Orthogonal Frequency Division Multiplexing (OFDM) symbol in an OFDM receiver using M-ary Phase Shift Keying (M-PSK) modulated pilot is provided. The method includes the steps of (a) positioning a FFT window at the received OFDM symbol, (b) performing a Fast Fourier Transformation (FFT) to obtain a frequency domain OFDM symbol, (c) extracting a pilot phase from the frequency domain OFDM symbol, (d) calculating a phase difference ($\theta_{DIFF}$) between the pilot phase and an adjacent pilot phase, (e) determining a variance of a zero mean phase deviation, (f) obtaining a cost function of the variance, (g) determining whether a value of a first variable (MIN) is greater than the cost function, (h) assigning a value of a second variable (count) to a third variable (MIN_K) as well as assigning a value of the cost function to the MIN only when a value of the MIN is greater than the cost function, (i) determining whether the count is lesser than a predefined iteration count, (j) assigning a value of the MIN_K to the symbol boundary only when the count is greater than or equal to the predefined iteration count, (k) shifting the FFT window by one sample when the count is less than the predefined iteration count and repeating said steps (a) to (i) until the count is greater than or equal to the predefined iteration count. The zero mean phase deviation is calculated by obtaining a difference between the phase difference ($\theta_{DIFF}$) and a quantized phase difference ($\theta_{QDIFF}$). The quantized phase difference ($\theta_{QDIFF}$) is obtained by quantizing the phase difference based on levels that range from $-\pi$ to $\pi$ based on the M-PSK modulated pilots. The cost function of the variance is obtained in accordance with equation:

$$\text{COST(COUNT)} = \sum_{K=\text{Pilot Locations}} \theta_{Delta}^2(K)$$

In another aspect, a method for pilotless detection of symbol boundary for a received Orthogonal Frequency Division Multiplexing (OFDM) symbol in an OFDM receiver using M-ary Phase Shift Keying (M-PSK) modulated carriers is provided. The method includes the steps of (a) positioning a FFT window at the received OFDM symbol, (b) performing a Fast Fourier Transformation (FFT) to obtain a frequency domain OFDM symbol, (c) extracting a data phase from the frequency domain OFDM symbol, (d) calculating a phase difference ($\theta_{DIFF}$) between the data phase and an adjacent data phase, (e) determining a variance of a zero mean phase deviation, (f) obtaining a cost function of the variance, (g) determining whether a value of a first variable (MIN) is greater than the cost function, (h) assigning a value of a second variable (count) to a third variable (MIN_K) as well as assigning a value of the cost function to the MIN only when a value of the MIN is greater than the cost function, (i) determining whether the count is lesser than a predefined iteration count, (j) assigning a value of the MIN_K to the symbol boundary only when the count is greater than or equal to the predefined iteration count, (k) shifting the FFT window by one sample when the count is less than the predefined iteration count and repeating the steps (a) to (i) until the count is greater than or equal to the predefined iteration count.

In yet another aspect, a method for reducing a number of FFT in a symbol time while detecting symbol boundary for received Orthogonal Frequency Division Multiplexing (OFDM) symbols in an OFDM receiver is provided. The method includes (a) shifting a FFT window across the received OFDM symbols by performing a FFT on said received OFDM symbols, (b) obtaining a variance of a zero mean phase deviations across the received OFDM symbols, (c) obtaining cost functions of the variance across the received OFDM symbols and (d) detecting the symbol boundary based on at least one cost function of the cost functions. The symbol boundary is detected based on a minimum cost function of the variance of the zero mean phase deviations across the received OFDM symbols. In one embodiment, method includes (i) shifting the FFT window across the received OFDM symbols by performing the FFT on the received OFDM symbols (ii) extracting pilot phases from the received OFDM symbols after the FFT is performed and (iii) projecting the pilot phases for a FFT window shift in accordance with an equation:

$$\theta_p(n+1) = \theta_p(n) + \frac{2\pi p}{N}$$

wherein P represents a pilot index, wherein $\theta_P(k)$ represents a phase of a $P^{th}$ carrier taken at a $k^{th}$ sample window, and wherein N represents a FFT length; and wherein said n equals FFT window position.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
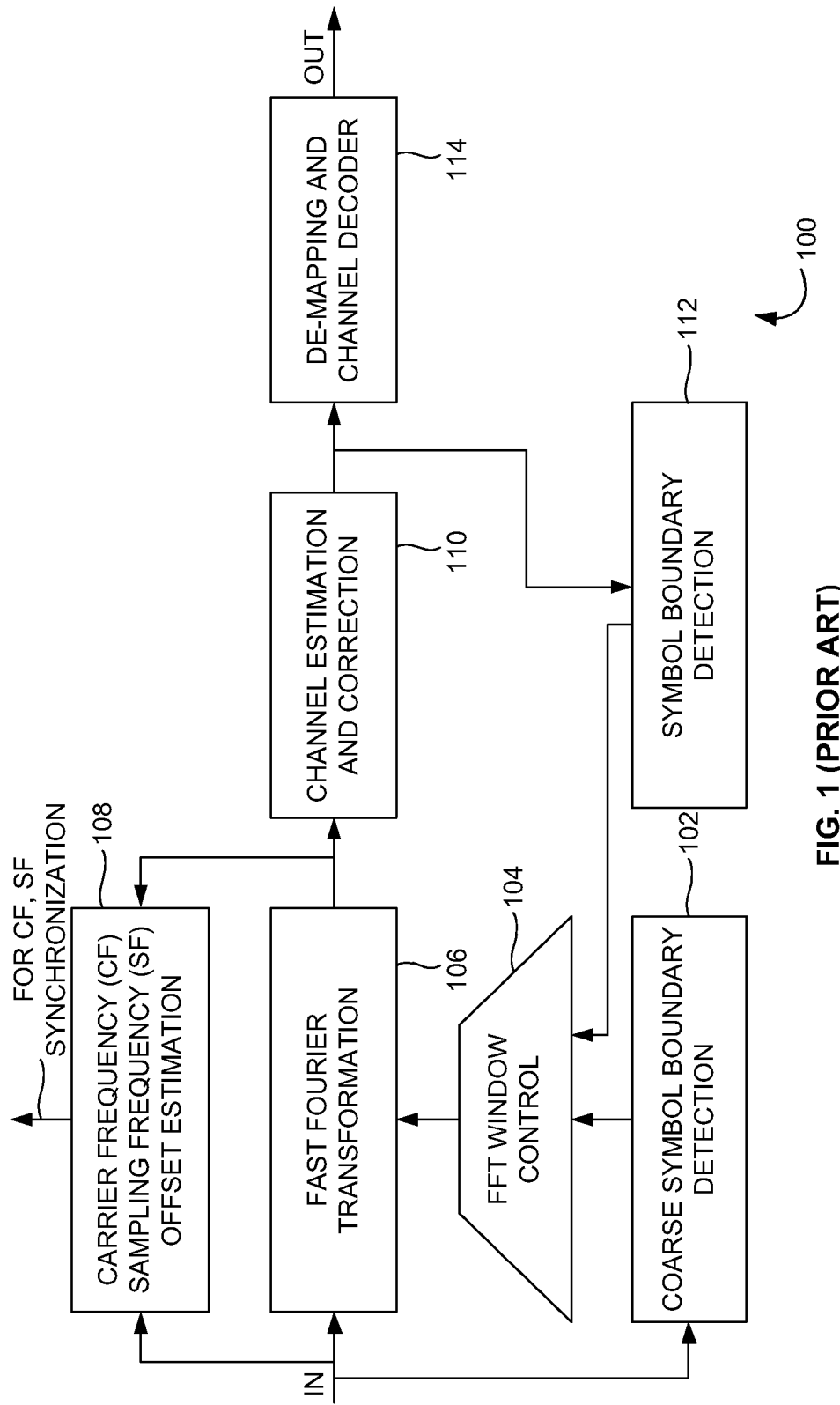
FIG. 1 illustrates a block diagram depicting a portion of a typical OFDM receiver.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for OFDM receiver system and method for identifying the FET boundary without the need for known information on the pilot carriers. The embodiments herein achieve this by providing a receiver system and method of estimating a symbol boundary using a $2^{nd}$ order moment of M-PSK modulated carriers as a cost function and thus enables to transmit the unknown information on pilot carriers. This increases the transmission bandwidth efficiency and also increases throughput per given transmission bandwidth of a modulation scheme. In addition, the receiver system is also capable of identifying the FFT boundary when the received OFDM symbols have known information on the pilot carriers. Referring now to the drawings, and more particularly to FIGS. 2 through 6, where similar reference characters denote corresponding features consistently throughout the figures, preferred embodiments are described herein.

Figure 2:
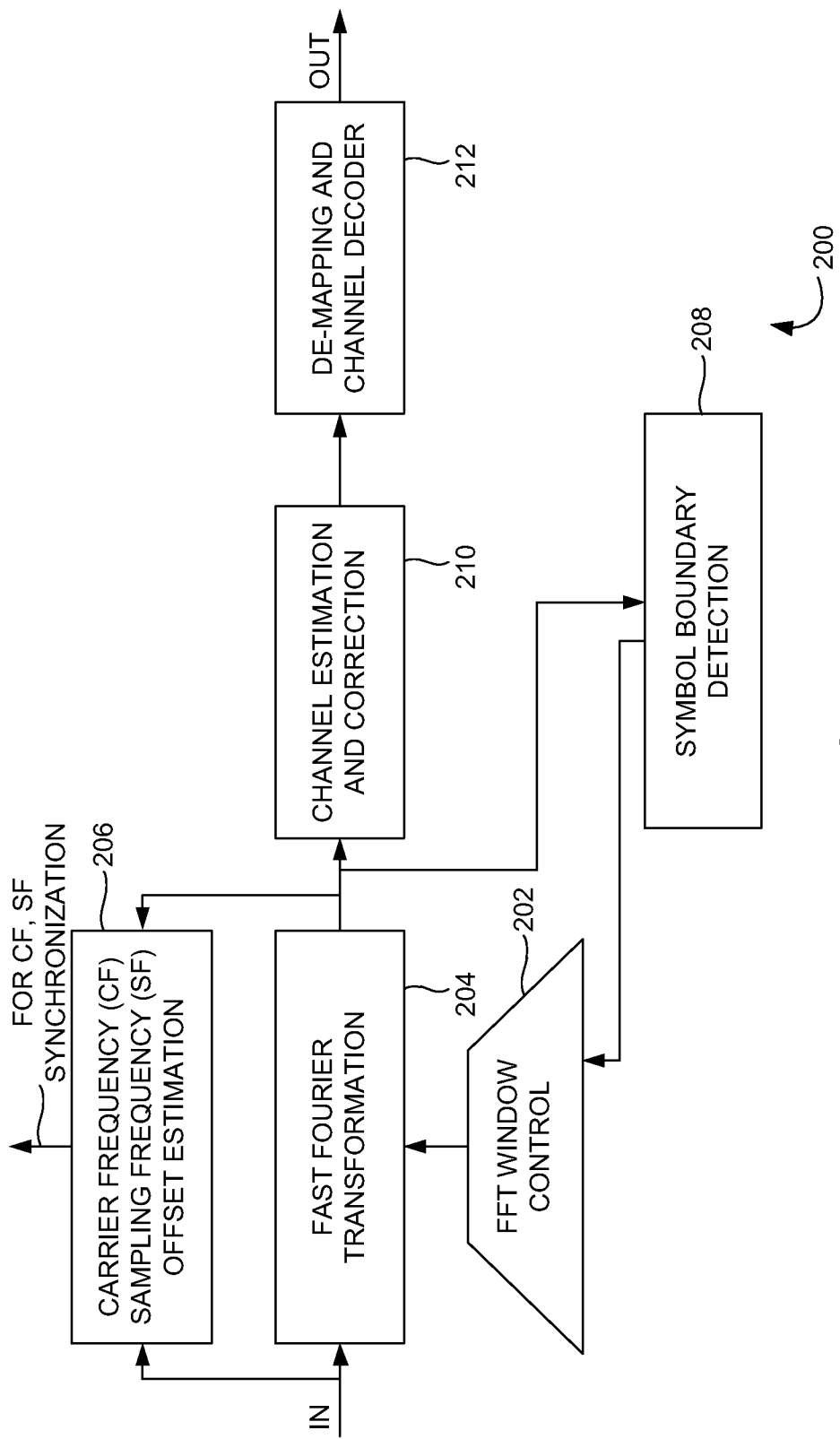
FIG. 2 illustrates a top level block diagram depicting a portion of an improved OFDM receiver according to an embodiment herein.

FIG. 2 illustrates a top level block diagram depicting a portion of an improved OFDM receiver 200 according to an embodiment herein. The portion of the OFDM receiver 200 includes a Fast Fourier Transformation (FFT) window control block 202, a Fast Fourier Transformation (FFT) block 204, a Carrier Frequency (CF) and a Sampling Frequency (SF) offset estimation block 206, a symbol boundary detection block 208, a channel estimation and correction block 210, and a de-mapping and channel decoder block 212.

The FFT window control block 202 positions the window to OFDM symbols. The FFT block 204 performs a Fast Fourier Transformation (FFT) on the OFDM symbols and outputs a frequency domain OFDM symbols. One or more pilot phases (Op) are extracted from the frequency domain OFDM symbols.

The second order moment of M-PSK modulated carriers may be used as a cost function (e.g., cost (count)) for determining a symbol boundary in case the OFDM symbol is received with unknown information on pilots (e.g., pilotless). The second order moment of M-PSK modulated pilots may be used as a cost function (e.g., cost (count)) for determining the symbol boundary in case the OFDM symbol is received with known information on pilots. In one embodiment, the M-PSK modulated pilots and M-PSK modulated carriers may be BPSK modulated signals or QPSK modulated signals. The difference between the adjacent phases of the received OFDM symbol would remove the effect of the carrier and phase frequency offsets. The difference between adjacent phases is calculated to obtain a phase difference ($\theta_{DIFF}$) and also how the $\theta_{DIFF}$ is deviated from $\pi$ to $-\pi$ is determined.

To achieve this, the phase difference $\theta_{DIFF}$ is quantized based on levels that range from $-\pi$ to $\pi$ to obtain a quantized phase difference ($\theta_{QDIFF}$). Further, the difference between the phase difference and the quantized phase difference ($\theta_{QDIFF}$) is obtained to determine $\theta_{DELTA}$ which is termed as zero mean phase deviation and corresponds to the deviation of the phase difference from $\pi$ to $-\pi$. The difference between the phase difference ($\theta_{DIFF}$) and the quantized phase difference ($\theta_{QDIFF}$) is determined in accordance with the equation:

$$\theta_{DELTA} = \theta_{DIFF} - \theta_{QDIFF}$$

The variance of the zero mean phase deviation ($\theta_{DELTA}$) is obtained and used as a cost function (e.g., cost(count)) for the symbol boundary detection and is determined in accordance with the equation:

$$\text{COST(COUNT)} = \sum_{K=Pilot\ Locations} \theta_{Delta}^2(K)$$

This enables the transmission of information on pilot carriers making them a part of payload data and increases transmission bandwidth efficiency. The above steps (determining the variance and using as a cost function) are repeated for each FFT window shift and corresponding zero mean phase deviations are recorded. The FFT window shift for which the variance is minimized corresponds to the symbol boundary.

Figure 3A:
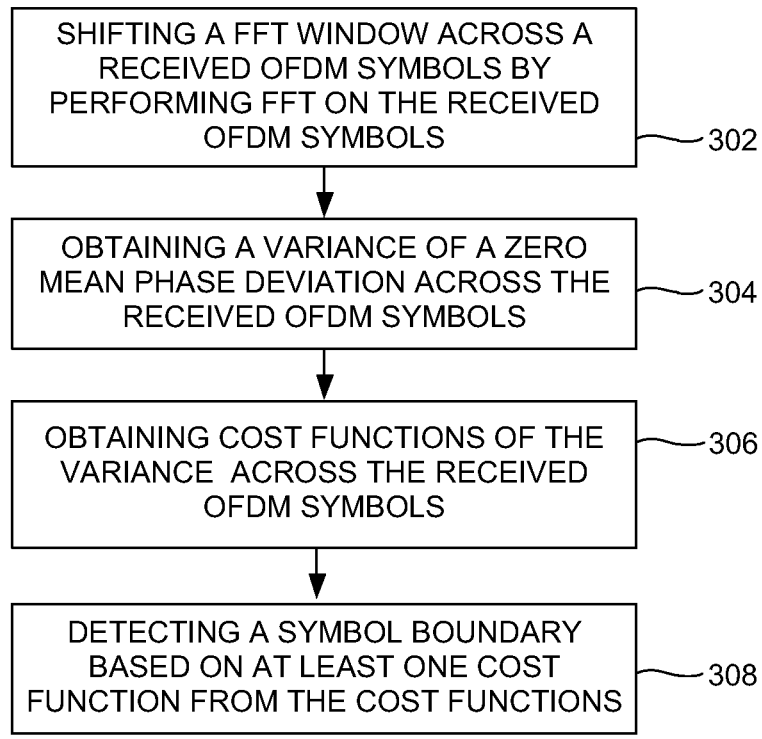
FIG. 3A through FIG. 3B are flow diagrams illustrating methods for reducing a number of FFT in a symbol time according to an embodiment herein.
Figure 3B:
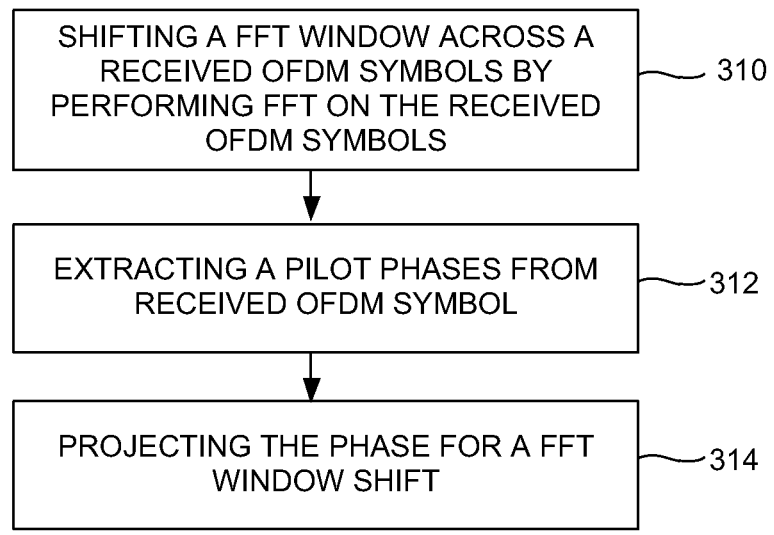

From the above steps, it is required to perform more FFT's and the following two approaches can be followed to avoid multiple FFT's in a symbol time. FIG. 3A through FIG. 3B are flow diagrams illustrating methods for reducing a number of FFT in a symbol time according to an embodiment herein. The method-1 includes (i) shifting a FFT window across a received OFDM symbols by performing FFT on the received OFDM symbols (302), (ii) obtaining a variance of a zero mean phase deviations across the received OFDM symbols (304), (iii) obtaining cost functions of the variance across the received OFDM symbols (306), and (iv) detecting the symbol boundary based on at least one cost function of the cost functions (308). The symbol boundary is detected based on a minimum cost function of the variance of the zero mean phase deviations across the received OFDM symbols.

For example, cost(1) may be obtained by performing a FFT for a first OFDM symbol. Similarly, cost(2) may be obtained by performing a FFT for a second OFDM symbol, and cost (N) may be obtained by performing a FFT at a $N^{th}$ OFDM symbol. The need of more FFT's is optimized by performing fewer FFT's in symbol time by shifting FFT window and performing the FFT across OFDM symbols and collecting variance of the zero mean phase deviation across multiple OFDM symbols. This would lead to symbol synchronization after several OFDM symbols.

The method-1 includes (i) shifting a FFT window across the received OFDM symbols by performing a FFT on the received OFDM symbols (310), (ii) extracting pilot phases from the received OFDM symbols after the FFT is performed (312) and (iii) projecting the pilot phases for a FFT window shift (314) in accordance with an equation:

$$\theta_p(n+1) = \theta_p(n) + \frac{2\pi p}{N}$$

where P is pilot index, $\theta_P(k)$ is the phase of the $P^{th}$ carrier taken at the $k^{th}$ sample window, and N is the FFT length and calculated in accordance with the equation: n=FFT window position.

Figure 4A:
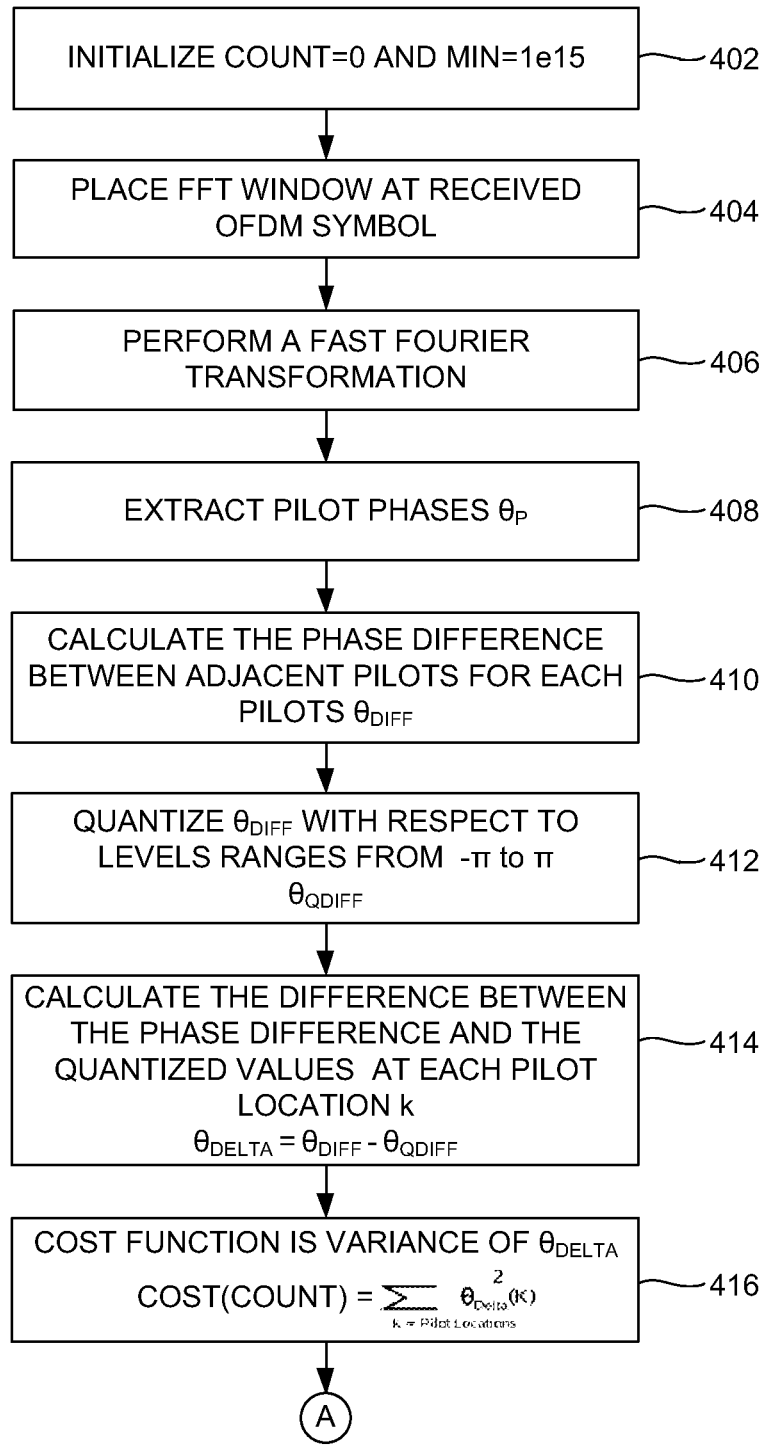
FIG. 4A through FIG. 4B are flow diagrams illustrating a method of detecting symbol boundary in OFDM receiver when a received OFDM symbol has known information on the pilots according to an embodiment herein.
Figure 4B:
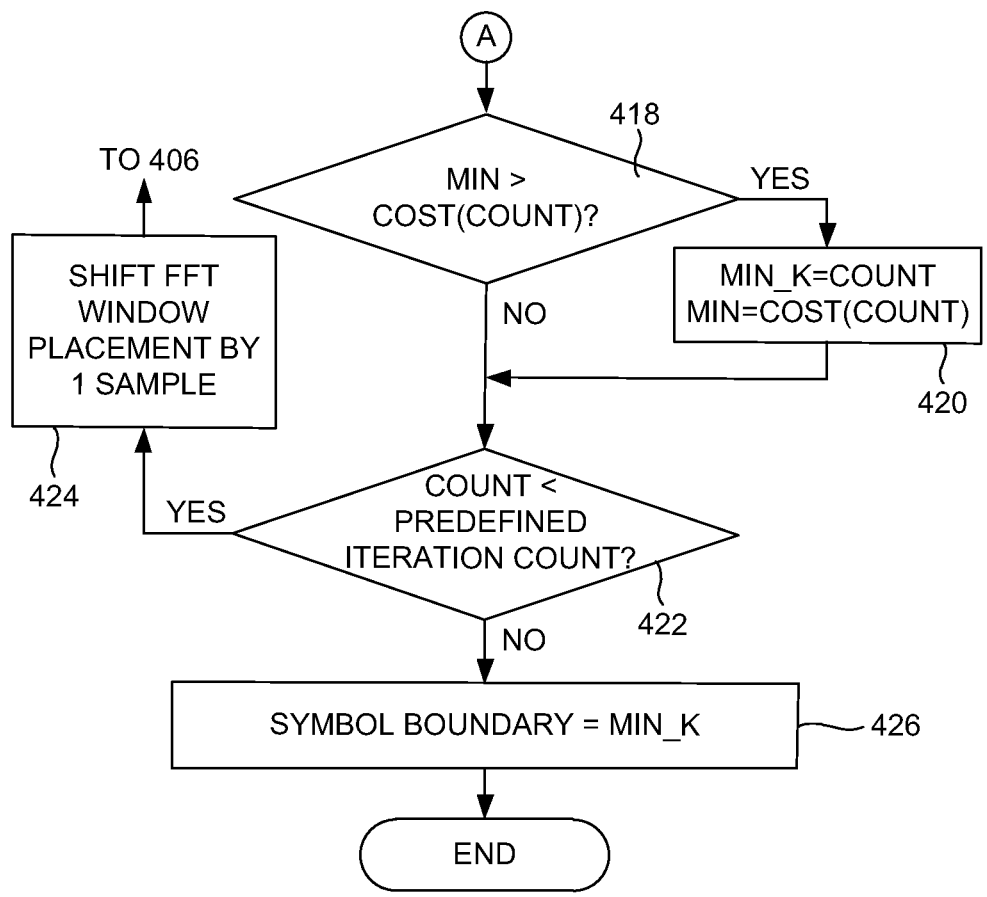

FIG. 4A through FIG. 4B are flow diagrams illustrating a method of detecting a symbol boundary in an OFDM receiver when a received OFDM symbol has known information on the pilots according to an embodiment herein. In step 402, the parameter count is initialized to zero (count=0) and MIN is initialized to 1e15 (MIN=1e15). In step 404, the FFT window is positioned to the OFDM symbol. In step 406, a FFT operation is performed on the OFDM symbol. In step 408, the pilot phases (Op) are extracted from the frequency domain OFDM samples after the FFT being performed.

In step 410, the phase difference ($\theta_{DIFF}$) between the adjacent pilots for each of the extracted pilot phases is calculated. In step 412, the phase difference ($\theta_{QDIFF}$) is quantized with respect to levels between $\pi$ to $-\pi$ to obtain quantized phase difference ($\theta_{QDIFF}$) at each pilot location. In step 414, zero mean phase deviation ($\theta_{DELTA}$) is calculated between the phase difference ($\theta_{DIFF}$) and the quantized phase difference ($\theta_{QDIFF}$) at each pilot location k. The zero mean phase deviation corresponds to the deviation of the phase difference from $\pi$ to $-\pi$. In step 416, variance of the zero mean phase deviation is obtained and used as a cost function (e.g., cost(count)) for the symbol boundary detection and the corresponding zero mean phase deviations are recorded.

In step 418, it is checked whether MIN is greater than the cost function. If yes, then, MIN_K is assigned equal to count, and MIN is assigned equal to cost function in step 420. Else (if No), it is checked whether the count is less than a predefined iteration count in step 422. The predefined iteration count determines the max symbol point. If the count is lesser than the predefined iteration count, then the FFT window placement is shifted by one sample in step 424 and step 406-422 is repeated. Else, (if No) the symbol boundary is assigned equal to MIN_K in step 426.

Figure 5A:
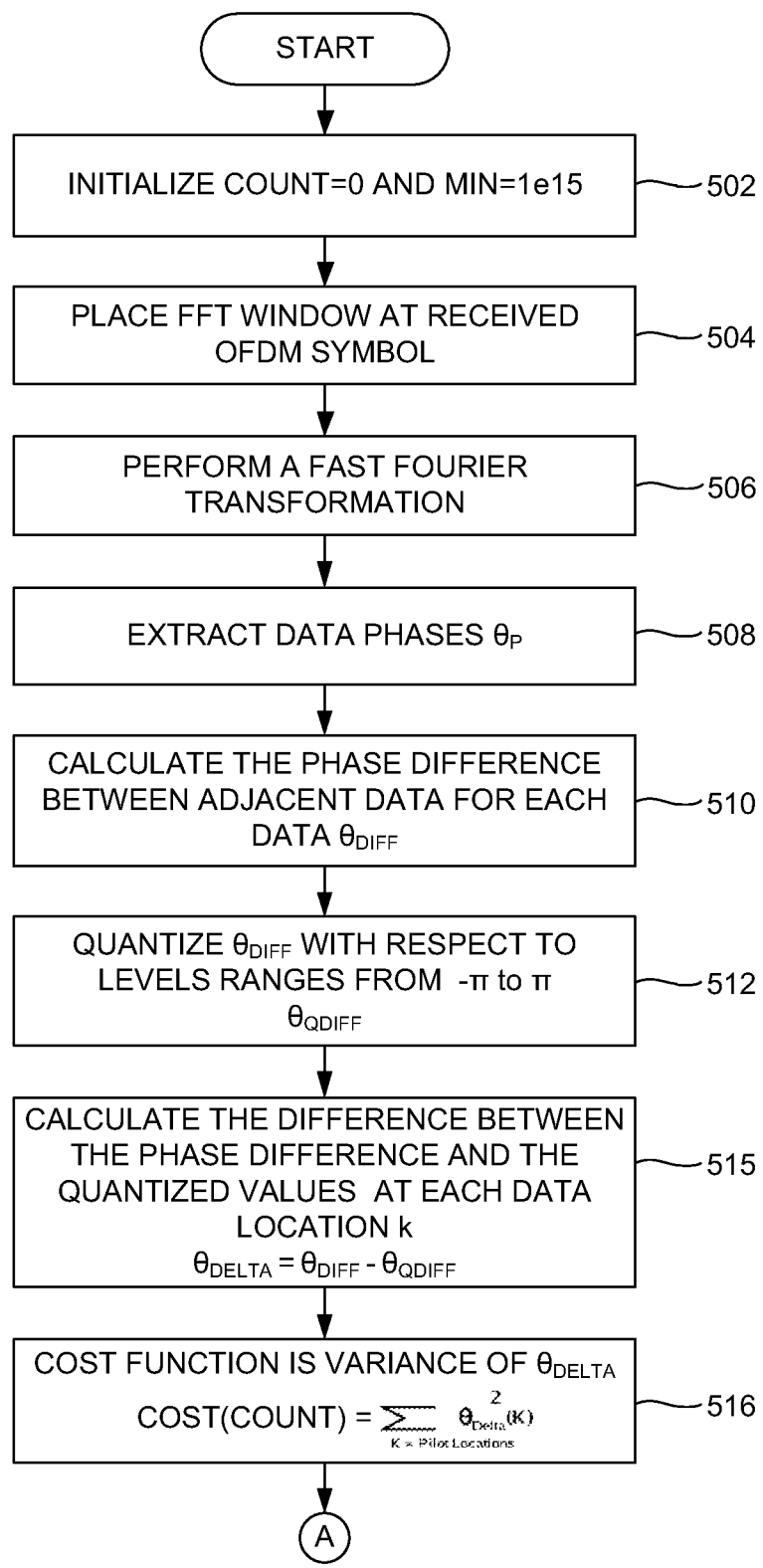
FIG. 5A through FIG. 5B are flow diagrams illustrating a method of detecting symbol boundary in the OFDM receiver when a received OFDM symbol does not have known information on the pilots (e.g. pilotless) according to an embodiment herein.
Figure 5B:
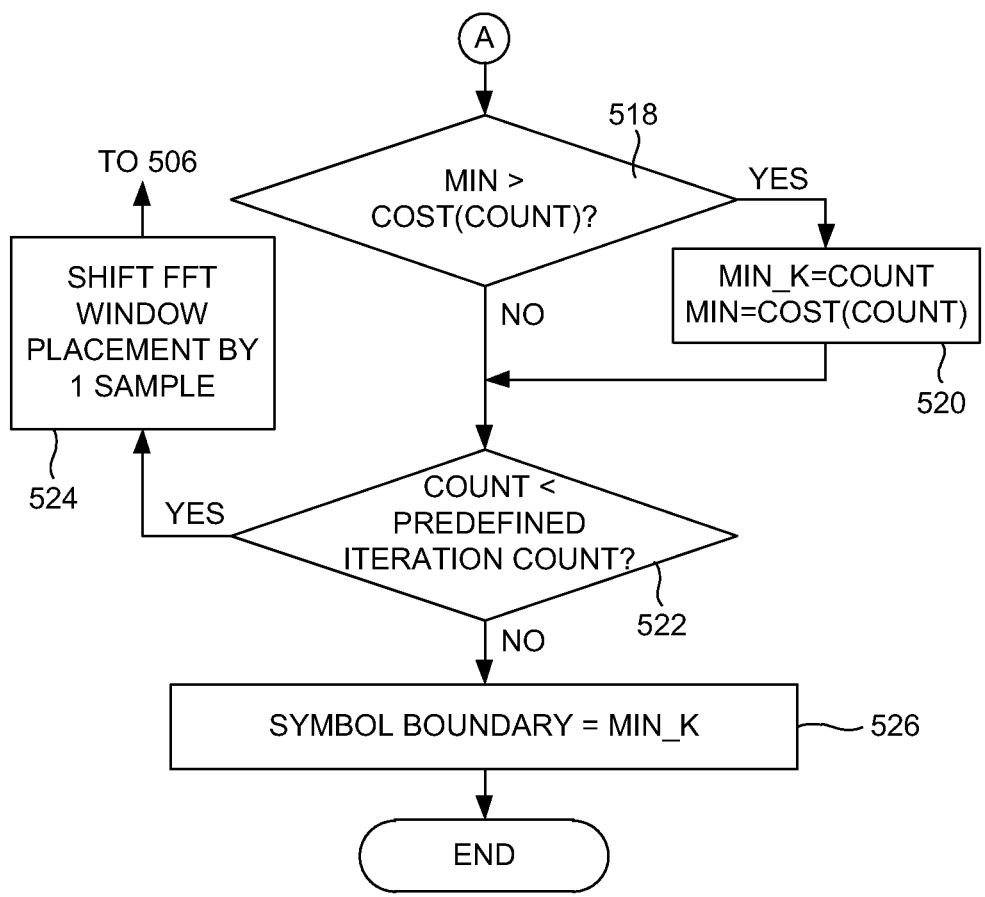

FIG. 5A through FIG. 5B are flow diagrams illustrating a method of detecting symbol boundary in the OFDM receiver when a received OFDM symbol does not have known information on the pilots (e.g. pilotless) according to an embodiment herein. In step 502, the parameter count is initialized to zero (count=0) and MIN is initialized to 1e15 (MIN=1e15). In step 504, the FFT window is positioned to the OFDM symbols. In step 506, a FFT operation is performed on the OFDM symbol. In step 508, the data phases ($\theta_P$) are extracted from the frequency domain OFDM samples after the FFT being performed.

In step 510, the phase difference ($\theta_{DIFF}$) between the adjacent data for each of the extracted data phases is calculated. In step 512, the phase difference ($\theta_{DIFF}$) is quantized with respect to levels between $\pi$ to $-\pi$ to obtain quantized phase difference ($\theta_{QDIFF}$) at each data location. In step 514, zero mean phase deviation ($\theta_{DELTA}$) is calculated between the phase difference ($\theta_{DIFF}$) and the quantized phase difference ($\theta_{QDIFF}$) at each data location k. The zero mean phase deviation corresponds to the deviation of the phase difference from it $\pi$ to $-\pi$. In step 516, variance of the zero mean phase deviation is obtained and used as a cost function (e.g., cost (count)) for the symbol boundary detection and the corresponding zero mean phase deviations are recorded.

In step 518, it is checked whether MIN is greater than the cost function. If yes, then, MIN_K is assigned equal to count, and MIN is assigned equal to the cost function in step 520. Else (if No), it is checked whether count is less than a predefined iteration count in step 522. The predefined iteration count determines the max symbol point. If the count is less than the predefined iteration count, then the FFT window placement is shifted by 1 sample in step 524, and step 506-522 is repeated. Else, (if No) symbol boundary is assigned equal to MIN_K in step 526.

Figure 6:
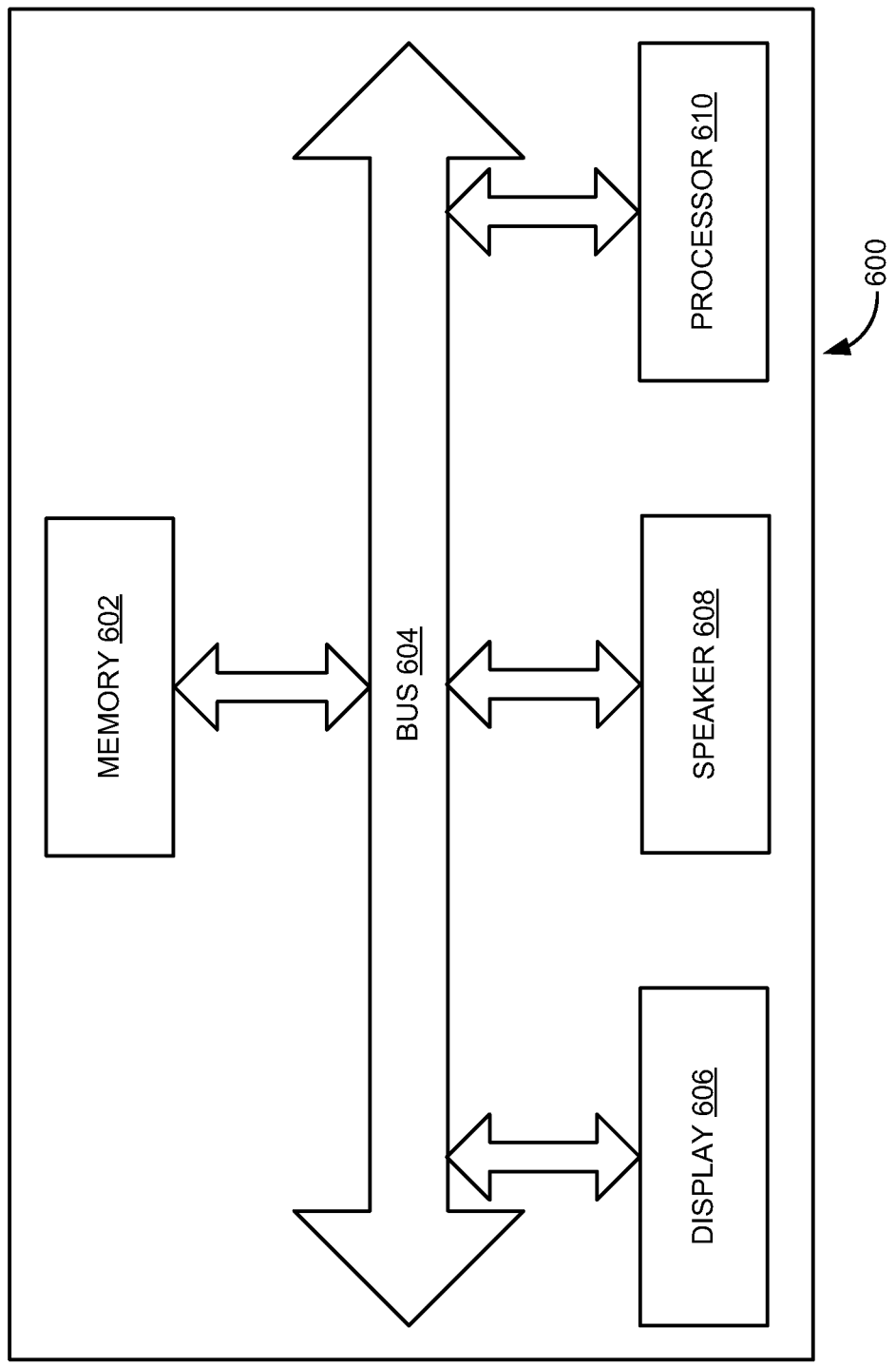
FIG. 6 illustrates an exploded view of a receiver according to an embodiment herein.

FIG. 6 illustrates exploded view of a receiver 600 having an a memory 602 having a computer set of instructions, a bus 604, a display 606, a speaker 608, and a processor 610 capable of processing a set of instructions to perform any one or more of the methodologies herein, according to an embodiment herein. The processor 610 may also enable digital content to be consumed in the form of video for output via one or more displays 606 or audio for output via speaker and/or earphones 608. The processor 610 may also carry out the methods described herein and in accordance with the embodiments herein. Digital content may also be stored in the memory 602 for future processing or consumption. The memory 602 may also store program specific information and/or service information (PSI/SI), including information about digital content (e.g., the detected information bits) available in the future or stored from the past.

A user of the receiver 600 may view this stored information on display 606 and select an item of for viewing, listening, or other uses via input, which may take the form of keypad, scroll, or other input device(s) or combinations thereof. When digital content is selected, the processor 610 may pass information. The content and PSI/SI may be passed among functions within the receiver 600 using bus 604. The receiver 600 includes the components that are a portion of the improved OFDM receiver 200 depicted in FIG. 2.

The embodiments herein relate to a blind symbol synchronization scheme for OFDM system. The improved blind symbol synchronization scheme eliminates the need to send known information on pilots. This increases a payload data per given transmission bandwidth. The improved receiver eliminates the need of coarse symbol boundary detection block which is used in the typical OFDM receiver.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An Orthogonal Frequency Division Multiplexing (OFDM) receiver for detection of a symbol boundary for a received OFDM symbol using a M-ary Phase Shift Keying (M-PSK) modulated pilot, said OFDM receiver comprising:
   a Fast Fourier Transformation (FFT) window control block that positions a FFT window on said received OFDM symbol to obtain a frequency domain OFDM symbol; and
   a symbol boundary detection block that detects a symbol boundary of said received OFDM symbol by recording a zero mean phase deviation for said FFT window;
   wherein a pilot phase of said M-PSK modulated pilot is extracted from said frequency domain OFDM symbol,
   wherein a second order moment of said M-PSK modulated pilot is used as a cost function for determining said symbol boundary, and
   wherein said zero mean phase deviation is calculated by obtaining a difference between a phase difference ($\theta_{DIFF}$) and a quantized phase difference ($\theta_{QDIFF}$).

2. The OFDM receiver of claim 1, wherein said M-PSK modulated pilot comprises any of a Binary Phase Shift Keying (BPSK) modulated signal and a Quadrature Phase Shift Keying (QPSK) modulated signal.

3. The OFDM receiver of claim 1, further comprising:
   a Fast Fourier Transformation (FFT) block that is connected to said FFT window control block, wherein said FFT block performs a FFT on said received OFDM symbol; and
   a carrier frequency (CF) and a sampling frequency (SF) block that receives said received OFDM symbol for CF and SF synchronization.

4. A method for detection of a symbol boundary for a received Orthogonal Frequency Division Multiplexing (OFDM) symbol in an OFDM receiver using a M-ary Phase Shift Keying (M-PSK) modulated pilot, said method comprising steps of:
   (a) positioning a Fast Fourier Transformation (FFT) window at said received OFDM symbol;
   (b) performing a FFT to obtain a frequency domain OFDM symbol;
   (c) extracting a pilot phase from said frequency domain OFDM symbol;
   (d) calculating a phase difference ($\theta_{DIFF}$) between said pilot phase and an adjacent pilot phase, wherein said phase difference removes an effect of carrier and phase frequency offsets;
   (e) determining a variance of a zero mean phase deviation, wherein said zero mean phase deviation is calculated by obtaining a difference between said phase difference ($\theta_{DIFF}$) and a quantized phase difference ($\theta_{QDIFF}$); and
   (f) obtaining a cost function of said variance for said symbol boundary detection.

5. The method of claim 4, further comprising:
(g) determining whether a value of a first variable (MIN) is greater than said cost function;
(h) assigning a value of a second variable (count) to a third variable (MIN_K) as well as assigning a value of said cost function to said MIN only when a value of said MIN is greater than said cost function;
(i) determining whether said count is less than a predefined iteration count; and
(j) assigning a value of said MIN_K to said symbol boundary only when said count is greater than or equal to said predefined iteration count.

6. The method of claim 5, further comprising:
(k) shifting said FFT window by one sample only when said count is less than said predefined iteration count; and
repeating said steps (a) to (i) until said count is greater than or equal to said predefined iteration count.

7. The method of claim 4, wherein said quantized phase difference ($\theta_{QDIFF}$) is obtained by quantizing said phase difference based on levels that range from $-\pi$ to $\pi$ based on said M-PSK modulated pilot.

8. The method of claim 4, wherein said cost function of said variance is obtained in accordance with an equation:

$$\text{COST(COUNT)} = \sum_{K=\text{Pilot Locations}} \theta^2_{Delta}(K).$$

9. A method for pilotless detection of symbol boundary of a received Orthogonal Frequency Division Multiplexing (OFDM) symbol in an OFDM receiver using a M-ary Phase Shift Keying (M-PSK) modulated carrier, said method comprising:
(a) positioning a Fast Fourier Transformation (FFT) window at said received OFDM symbol;
(b) performing a FFT to obtain a frequency domain OFDM symbol;
(c) extracting data phases from said frequency domain OFDM symbol;
(d) calculating a phase difference ($\theta_{DIFF}$) between said data phase and an adjacent data phase, wherein said phase difference removes an effect of carrier and phase frequency offsets;
(e) determining a variance of a zero mean phase deviation, wherein said zero mean phase deviation is calculated by obtaining a difference between said phase difference ($\theta_{DIFF}$) and a quantized phase difference ($\theta_{QDIFF}$); and
(f) obtaining a cost function using said variance for said symbol boundary detection.

10. The method of claim 9, further comprising:
(g) determining whether a value of a first variable (MIN) is greater than said cost function;
(h) assigning a value of a second variable (count) to a third variable (MIN_K) as well as assigning a value of said cost function to said MIN only when MIN is greater than said cost function;
(i) determining whether said count is less than a predefined iteration count; and
(j) assigning said symbol boundary to said MIN_K only when said count is greater than or equal to said predefined iteration count.

11. The method of claim 10, further comprising:
(k) shifting said FFT window by one sample only when said count is less than said predefined iteration count, and
repeating said steps (a) to (i) until said count is greater than or equal to said predefined iteration count.

12. A method for reducing a number of Fast Fourier Transform (FFT) in a symbol time while detecting a symbol boundary for received Orthogonal Frequency Division Multiplexing (OFDM) symbols in an OFDM receiver, said method comprising:
(a) shifting a FFT window across said received OFDM symbols by performing a FFT on said received OFDM symbols;
(b) obtaining a variance of a zero mean phase deviations across said received OFDM symbols;
(c) obtaining cost functions of said variance across said received OFDM symbols; and
(d) detecting said symbol boundary based on at least one cost function from said cost functions.

13. The method of claim 12, wherein said symbol boundary is detected based on a minimum cost function of said variance of said zero mean phase deviations across said received OFDM symbols.

14. The method of claim 12, further comprising:
(e) shifting said FFT window across said received OFDM symbols by performing said FFT on said received OFDM symbols;
(f) extracting pilot phases from said received OFDM symbols after said FFT is performed; and
(g) projecting said pilot phase for a FFT window shift in accordance with an equation:

$$\theta_p(n+1) = \theta_p(n) + \frac{2\pi p}{N}$$

wherein P represents a pilot index, $\theta p (k)$ represents a phase of a $P^{th}$ carrier taken at a $k^{th}$ sample window, and N represents a FFT length, and wherein said n equals FFT window position.

* * * * *